Figure 1:
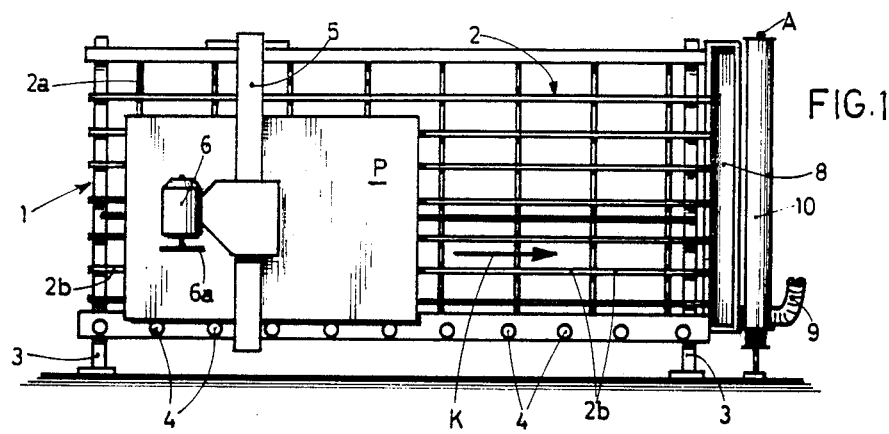

United States Patent [19]

Striebig

[11] Patent Number: 4,802,392

[45] Date of Patent: Feb. 7, 1989

[54] METHOD OF EXTRACTING THE WOOD DUST COLLECTING IN VERTICAL PANEL SAWS

[75] Inventor: Ludwig Striebig, Lucerne, Switzerland

[73] Assignee: Striebig AG, Switzerland

[21] Appl. No.: 41,938

[22] Filed: Apr. 24, 1987

[30] Foreign Application Priority Data

Apr. 25, 1986 [CH] Switzerland ............. 1702/86

[51] Int. Cl.$^4$ .................. B26D 7/18; B26D 1/18
[52] U.S. Cl. .................... 83/100; 83/471.2; 83/477.1; 144/252 R
[58] Field of Search ................. 83/23, 24, 100, 477.1, 83/471.2; 144/252 A, 252 R; 29/DIG. 84, DIG. 86; 51/273; 409/137

[56] References Cited

U.S. PATENT DOCUMENTS

| | | | |
|---|---|---|---|
| 4,150,597 | 4/1979 | Striebig | 83/471.3 |
| 4,181,054 | 1/1980 | Striebig | 83/153 |
| 4,183,272 | 1/1980 | Striebig | 83/411 R |
| 4,202,231 | 5/1980 | Striebig | 83/466 |
| 4,485,712 | 12/1984 | Gerber | 83/100 |
| 4,631,999 | 12/1986 | Striebig | 83/471.2 |
| 4,638,695 | 1/1987 | Striebig | 83/100 |

Primary Examiner—E. R. Kazenske
Assistant Examiner—Scott A. Smith
Attorney, Agent, or Firm—Browning, Bushman, Zamecki & Anderson

[57] ABSTRACT

The panel saw has an upright supporting grid (2) with vertical and horizontal supporting bars (2a and 2b resp.). The pivotable saw unit (6) is attached to a displaceable beam (5).

In order to reliably pick up the wood dust which collects behind the panel (P) to be sawed and which according to the invention amounts to 3 to 5% of the total wood dust quantity, a continuous cover element (7) is fixed to the rear side of the supporting grid (2). Moreover, a rotatably mounted spindle (A) with a sealing foil (10) which can be rolled up is arranged in the marginal area of the supporting grid (2). The sealing foil (10) is brought to bear against the panel edge adjacent to it by a counterweight arrangement (G) having tension cables (12, 18).

Flow channels (K) are thereby formed between the horizontal supporting bars (2b), which flow channels (K) are defined on the rear side by the cover element (7) and on the front side by the panel (P) and the sealing foil (10). All the channels (K) open into a vertical collecting channel (8) which is connected to an extraction fan via a line (9).

Owing to this arrangement, the remaining dust collecting behind the panel (P) can also be reliably extracted.

8 Claims, 6 Drawing Sheets

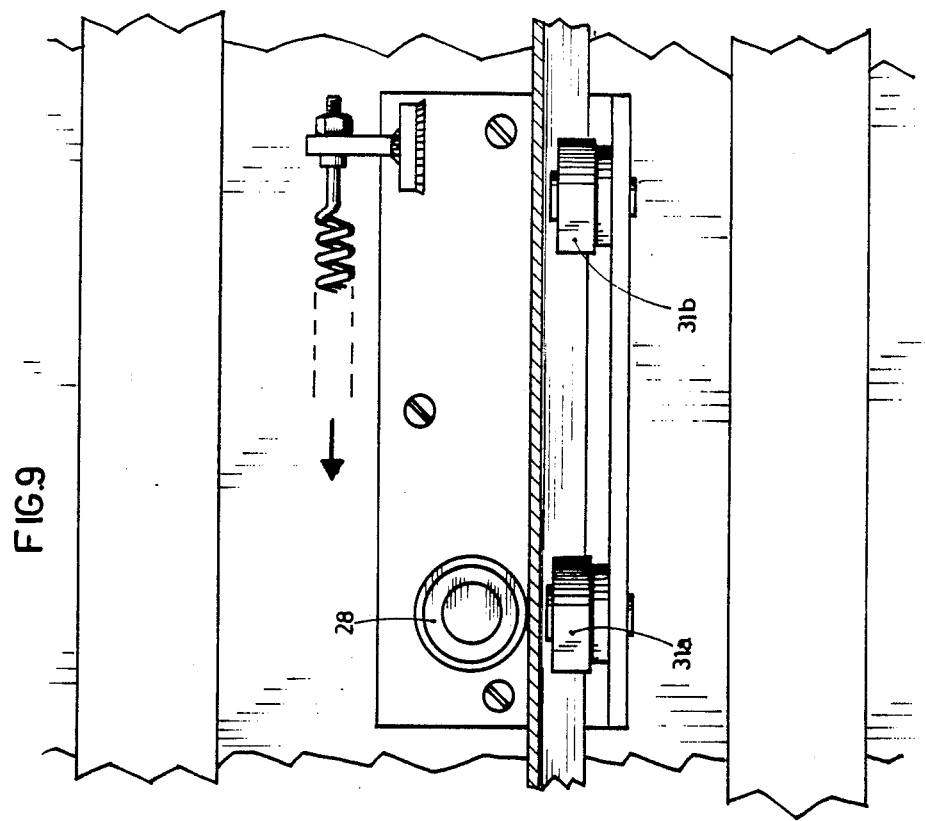
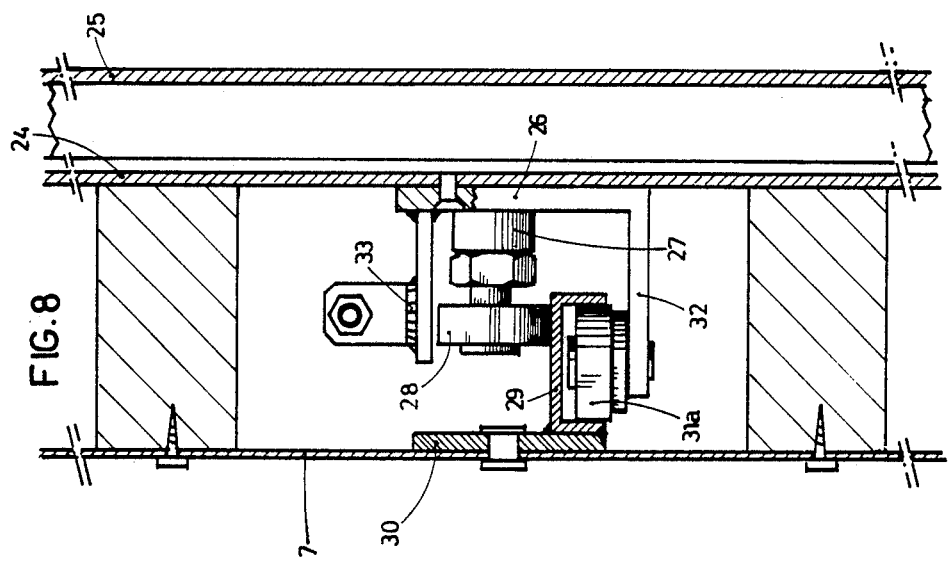

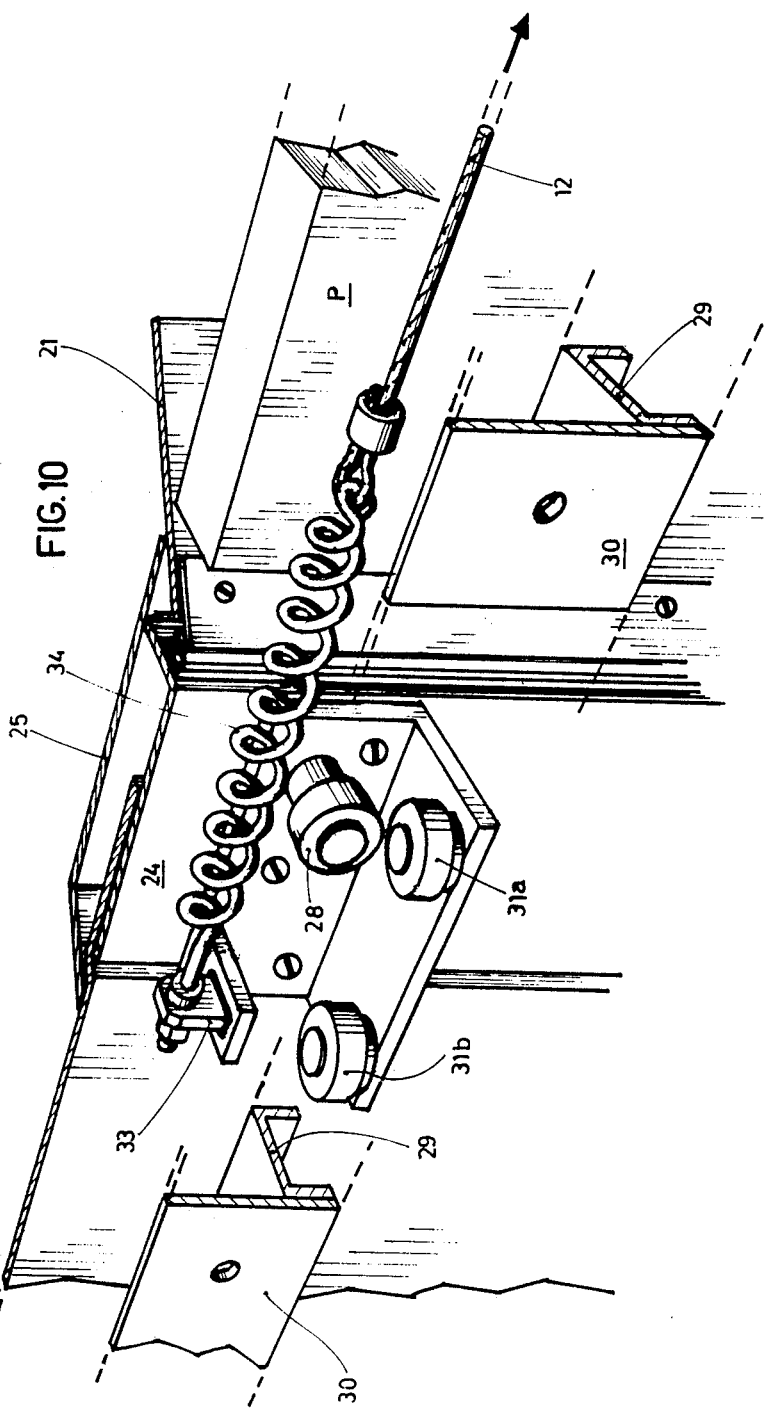

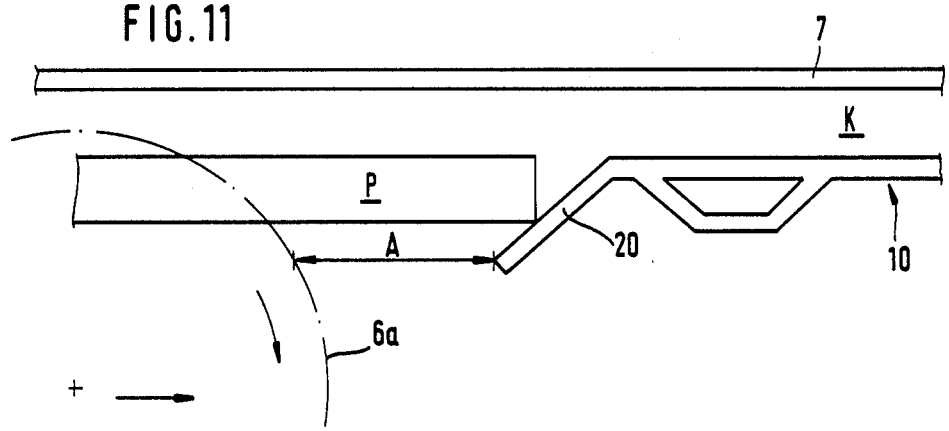
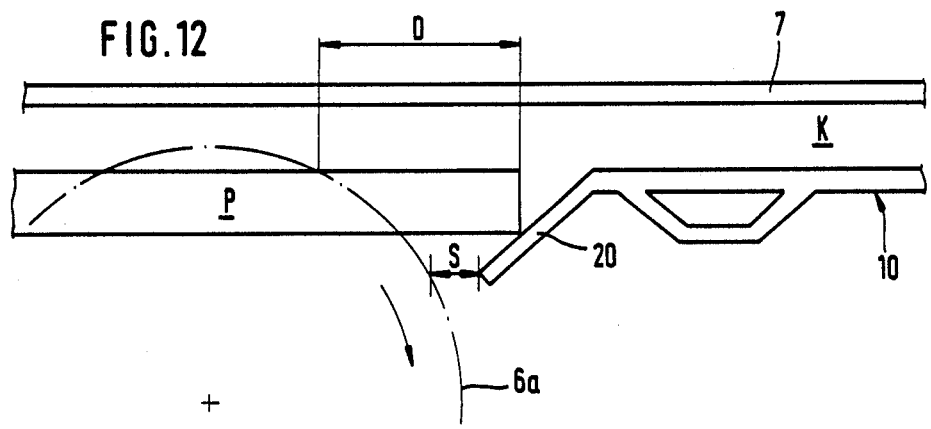
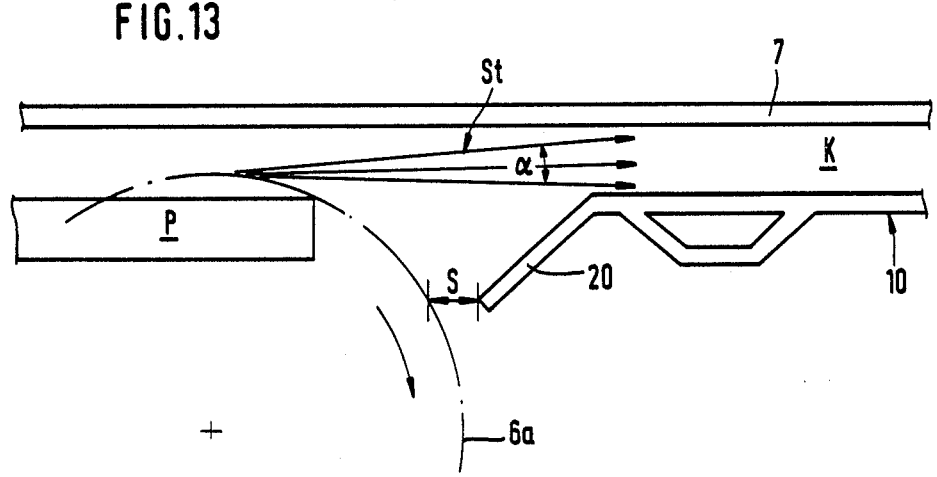

METHOD OF EXTRACTING THE WOOD DUST COLLECTING IN VERTICAL PANEL SAWS

When panels of wood, i.e. chipboard or solid wood panels are being sawed, it is known that not only do sawing chips or sawing waste collect but also a certain portion of finest wood dust. In the known panel saws, as described, for example, in German Patent Specification No. 2,813,726, the wood dust collecting in the cutting area in front of the panel is extracted and carried off together with the coarser chips during the cutting operations. This portion of wood dust and sawing chips collecting in front of the panel amounts to about 95–97% of the total quantity collecting. The remaining 3–5%, which consists practically entirely of the finest wood dust, is thrown by the rotating circular saw blade behind the panel where it is released from the saw blade in the tangential direction, passes into the surroundings and therefore is not only deposited on the equipment in the particular room but represents above all a considerable health risk for the working personnel.

Those of skill in the art are familiar with the fact that, in the horizontally arranged panel saws, withdrawing the wood dust collecting there beneath the panel does not pose any great difficulties, since the dust, in this horizontal type of construction, can be extracted by a channel arranged in a stationary position.

In the vertical panel saw, however, it is known that there are quite different constructional and functional conditions which have hitherto made the extraction of wood dust behind the panel seem exceptionally difficult if not quite impossible. Since the saw unit in the vertical type of construction is arranged on a movable beam, the arrangement of a stationary extraction channel is out of the question. However, an extraction channel guided along the with the saw beam, in view of the frame bearing the panel supporting grid, is likewise impossible to implement.

For this reason, it is probably possible in the known panel saws to extract the quantity of wood dust and sawing waste collecting in front of the panel; but it has hitherto not been possible, because of the difficulties mentioned, to pick up the remaining 3 to 5% of the wood dust collecting behind the panel.

It is therefore the object of the present invention to propose a method and a panel saw which, when horizontal cuts are being made, ensures uncomplicated and yet perfectly working extraction of the wood dust collecting behind the panel.

An exemplary embodiment of a panel saw according to the invention is described below with reference to the attached drawing.

Figure 2:
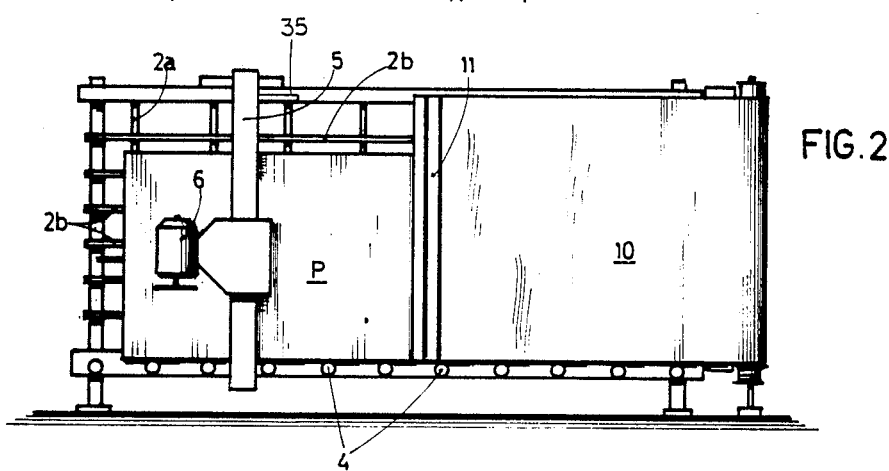
Figure 3:
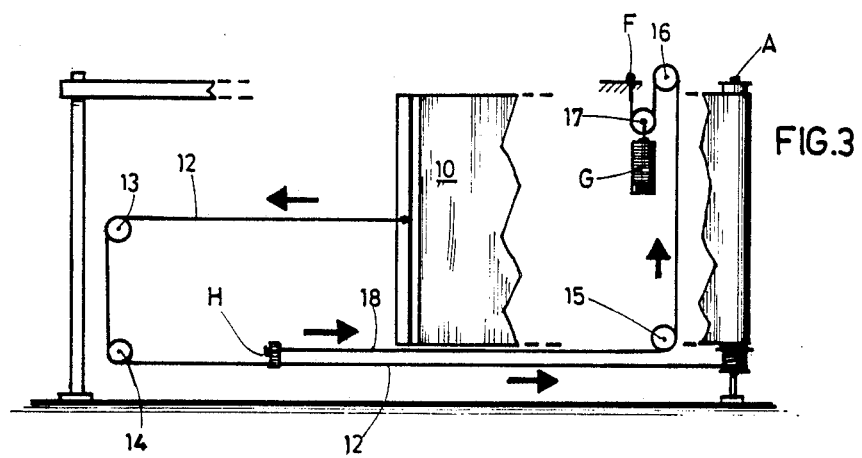
Figure 4:
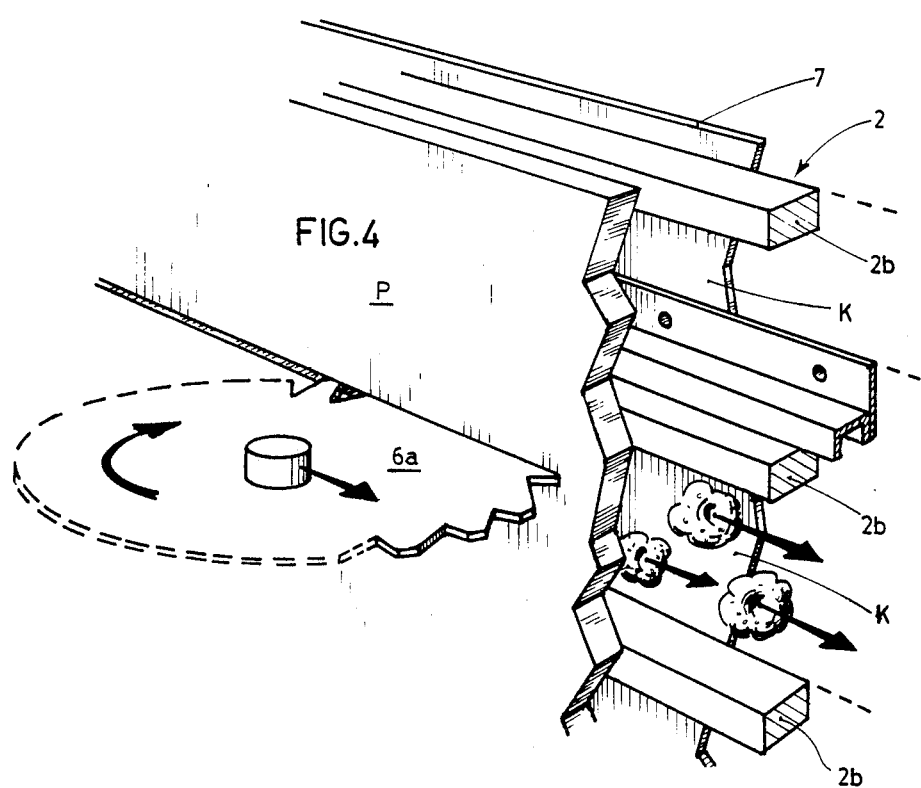
Figure 5:
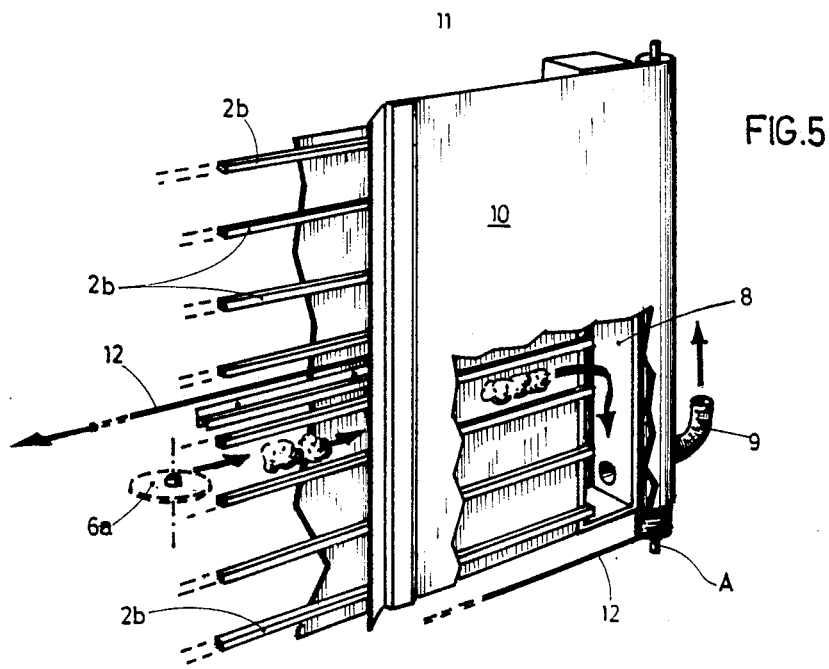
Figure 6:
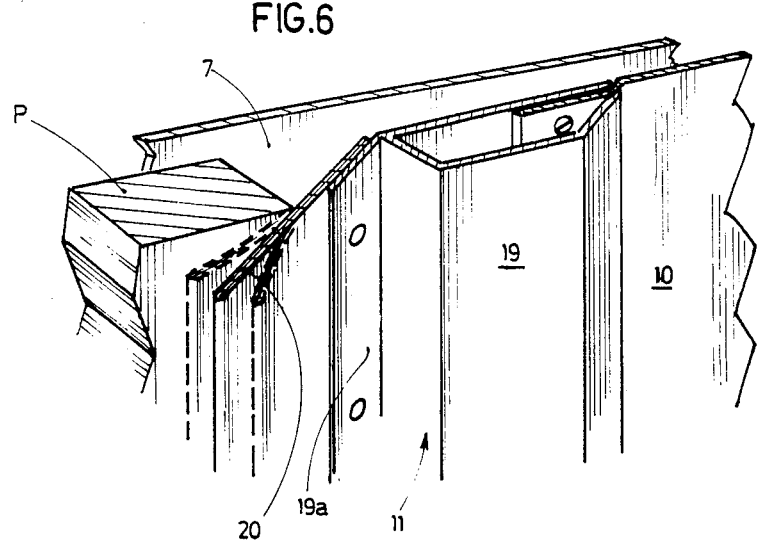
Figure 7:
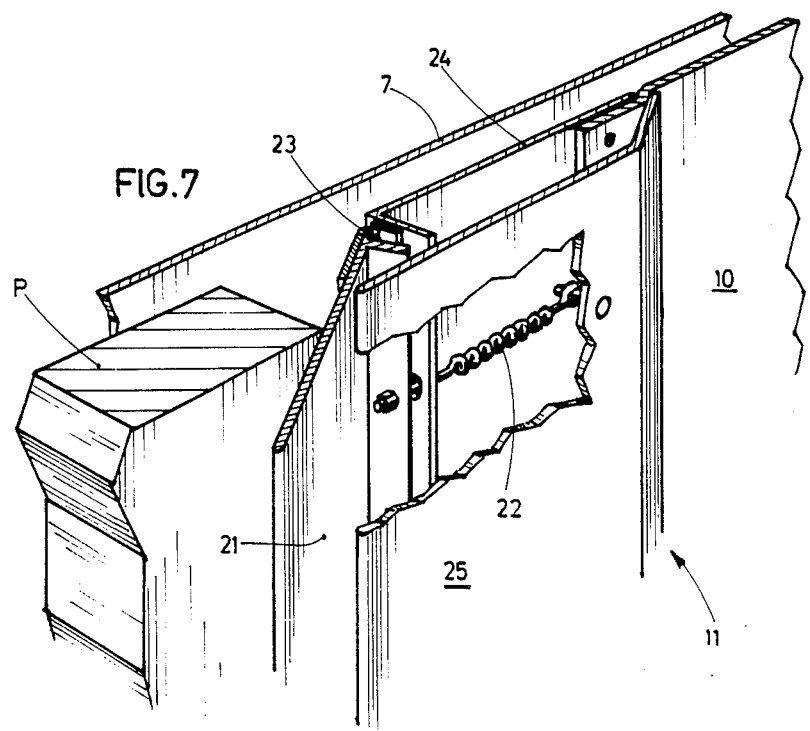

FIG. 1 is a front view of an embodiment of the inventive panel saw with a rolled-in sealing foil, FIG. 2 shows the same panel saw, also in front view, while a horizontal cut is being made, FIG. 3 schematically illustrates a method in which the sealing foil can be pretensioned in the direction of the panel, FIG. 4 perspectively shows a detail in the area of the panel to be sawed, FIG. 5 perspectively shows a detail in the extraction area covered by the sealing foil, FIG. 6 and 7 are perspective detailed views in the area of the panel edge, and FIGS. 8 to 10 illustrate the guidance of the sealing foil, and FIGS. 11 to 13 are schematic representations of an embodiment detail in connection with three successive phases of the sawing operation.

The panel saw shown in simplified form in FIGS. 1 to 3 has an upright frame 1 which bears a supporting grid 2 of vertical bars 2a and horizontal bars 2b. The frame 1, which is supported on the workshop floor via feet 3, bears in its lower area several support rollers 4 which are mounted in loosely rotatable manner and on which the panel P to be sawed is deposited and can be laterally displaced with a small expenditure of force.

Moreover, a vertical saw beam 5 is mounted in laterally displaceable manner on the frame 1, which saw beam 5 bears the pivotable saw unit 6. Further details of such a panel saw can be gathered, for example, from the Swiss Patent Specifications Nos. 617,119 and 621,083, but these details are not necessary for understanding the invention.

On the side remote from the panel P, the supporting grid 2 is provided with a cover plate 7 (of. FIG. 4) which is anchored in fixed manner, for example screwed, on the supporting grid 2, so that a row of parallel channels K (FIG. 4) enclosed on all sides are formed between this cover place 7, the panel P to be sawed, and the horizontal supporting grid bars 2b. All the channels K open into a vertical collecting channel 8 which is connected via a line 9 to an extraction fan. The parallel channels K located one above the other are closed on the narrow side opposite the collecting channel 8, so that practically all wood dust passing into the same can be extracted through the collecting channel 8 in the direction of the arrow (FIG. 4).

In the arrangement shown in FIG. 1, however, extraction via the collecting channel 8 would be ineffective, because the channels K there are open in the intermediate space between the panel P and the collecting channel 8. In order to seal this open area, a sealing foil 10 is arranged next to the collecting channel 8, which sealing foil 10 extends over the entire height of the supporting grid 2 and according to FIG. 1 is rolled up into an upright roll on a rotatably mounted spindle A. So that the sealing foil 10 can now reliably rest against any panel P, the sealing foil 10 is subjected to a pretension or a constantly acting tensile force in the direction of the panel P so that the front end of the foil - as shown in FIG. 2 - constantly rests against the panel edge adjacent to it.

The extraction channels K are then closed over their entire length necessary for the extraction of wood dust.

The above mentioned pretensioning or constant tensile action, which ensures that the sealing foil 10 rests against the panel edge, can be achieved in different ways. A counterweight arrangement which is described below with reference to FIG. 3 would probably prove to be best.

Fixed on the front end of the sealing foil 10, which is formed by a rigid sealing construction 11, is a tension cable 12 which is guided via guide rollers 13 and 14 to the spindle A of the sealing foil 10, can be unwound from the spindle A and is rewound by a spring acting on the said spindle A. Acting on the tension cable 12 is an auxiliary cable 18 (point of application H) which is guided via guide rollers 15, 16 and 17, is anchored on the frame (fixed point F) and is loaded by a weight G. As FIG. 3 shows, the weight G causes the sealing foil 10 to be constantly pulled in the direction of the arrow against the panel (not shown here).

FIGS. 4 and 5 show how the wood dust between the rear wall formed by the cover plate 7 and the front wall formed by the panel P to be sawed and the sealing foil 10, which wood dust is thrown off tangentially from the circular saw blade 6a into the particular extraction channel K, passes into the collecting channel 8 and can be fed from there to a collecting container through the line 9.

In order to seal the contact location between the sealing foil 10 and the panel P as soundly as possible, the front edge of the sealing foil 10, which is to rest against the adjacent panel edge, can be designed, for example, according to FIG. 6. The sealing construction 11 already mentioned is fixed to the flexible foil 10, which is to be made of a material impermeable to air, which sealing construction 11 has a rigid metallic section 19, on the inclined web 19a of which is arranged a flexible sealing lip 20. The sealing lip automatically adapts itself to the different panel thicknesses.

In the embodiment according to FIG. 7 a rigid sealing lip 21 is selected which is made in an L-shape and on the narrower leg of which acts a compression spring 22. The sealing lip 21 fixed to the metal section 24 by means of a hinge 23 is thus brought to bear against the adjacent panel edge by the compression spring 22. The compression spring 22 can be concealed by a further section 25.

The sealing foil 10 extending over the entire height of the supporting grid 2 must be guided with regard to the desired sealing so that on the one hand it maintains the correct height over its entire pull-out length and on the other hand also rests as closely as possible against the bars 2a/2b of the supporting grid 2. The guide arrangement shown in FIGS. 8, 9 and 10 is used for this purpose.

In the area of the sealing construction 11 of the sealing foil 10, as shown in FIG. 7, a plate 26 is riveted on to the section 24, which plate 26, on a support arm 27, supports a roller 28 mounted on ball bearings. This roller rolls on a U-shaped rail 29 which is fixed to the cover plate 7 via a plate 30. The downwardly open rail 29 is at the same time used for laterally guiding two rollers 31a/31b which are likewise mounted on ball bearings and the support arms 32 of which are fixed to the section 24. In this way, the upper roller 28 ensures the vertical position and the lower rollers 31a/31b, guided with lateral clearance in the rail 29, ensure the exact lateral guidance of the sealing foil 10. Also fixed to the section 24 is the holder 33 for the tension cable 12, which is provided with a tension spring 34 for its length compensation.

The panel saw design described so far works satisfactorily with the exception of the last respective phase of the sawing operation, during which phase the saw blade 6a inevitably moves into the area of the free edge 20 (FIG. 6) or 21 (FIG. 7) of the sealing wall 10 and would damage the sealing wall 10 if the beam 5 supporting the saw unit is fed further. In order to reliably prevent this, a driver in the form of a driving tang 35 (FIG. 2) is arranged on the beam 5, which driving tang 35, at the correct moment, i.e. when the saw blade 6a is still located at a certain minimum safety distance from the sealing wall 10, strikes its free edge 20 or 21. The feed movement of the beam 5 is thus transmitted to the sealing wall 10 so that the beam 5 pushes the sealing wall 10 in front of it during the last phase of the sawing operation. The action taking place during this procedure will now be described with reference to FIGS. 11 to 13.

The free edge of the sealing wall 10 - that is, especially the sealing lip 20 (FIG. 6) or 21 (FIG. 7) - only rests, during the sawing operation, against the panel edge adjacent to it as long as the saw blade 6a is located far enough to the left of the sealing lip 20, i.e. as long as A>S (see FIGS. 11 and 12).

If the saw blade 6a moves further to the right in its feed direction, the distance A is reduced until finally a safety distance S is reached which must be maintained. As FIG. 12 shows, however, the panel P at this moment is not yet completely severed. For completely severing the panel, the saw blade must move to the right by at least the distance D. So that the sealing lip 20 or 21 and further elements of the sealing wall 10 are not sawed during this movement, the sealing wall 10, from the moment represented in FIG. 12, is pushed in such a way to the right by the driver 35 fixed on the saw beam that the safety distance S is always maintained. As is apparent from FIG. 13, the extraction channel K formed from the elements 7, 20 and 10 and also the panel P opens at the same time. However, since the opening angle $\alpha$ of the dust-particle stream St is much smaller than the opening angle of the collecting funnel formed from the elements 7 and 20, and since the channel K is also under vacuum, no dust is lost through the opening between the panel edge and the sealing lip.

The extraction action on the rear side is therefore also ensured while the saw blade comes out of the right-hand panel edge. When the saw blade returns, the sealing edge 10 is pulled back by the counterweight G (FIG. 3) until the sealing lip 20 is again located at the right-hand panel edge.

The panel saw design described ensures perfect extraction of all wood dust collecting behind the panel P.

Within the scope of the protective area defined in the independent patent claim, the panel saw described can be modified in many various ways by those of skill in the art. Thus the sealing foil 10, for example, if sufficient space is available, could also be replaced by a rigid plate.

The sealing foil 10 is preferably secured in its rolled-up end position according to FIG. 1 by a known locking device (not shown).

I claim:

1. A vertical panel saw comprising means for collecting sawdust accumulating behind a panel when the saw is making horizontal cuts therein, comprising a substantially vertical supporting grid on which a panel to be sawed is placed, said grid being formed from horizontally arranged, mutually parallel bars and on a front panel support side of which is arranged a vertical, laterally displaceable beam supporting a saw unit, said panel saw further comprising a rear side of the supporting grid, which rear side is remote from the panel support side and is completely closed by a cover element anchored in a stationary manner on the supporting grid, channels thereby formed between the grid bars adjacent to one another in pairs and connected to a vertical flow-off shaft, a movable sealing wall extending over the entire supporting grid height and arranged on the marginal section of the supporting grid which lies in the direction of the horizontal cut, said sealing wall being pretensioned in the direction of the panel to be sawed, and coupling means cooperative between said beam and a free edge of the sealing wall to cause joint lateral movement of said beam and sealing wall, said free edge of the sealing wall normally resting against an edge of said panel, said coupling means interengaging said free edge of the sealing wall and said beam in order to prohibit said saw from engaging said free edge of said sealing wall.

2. The panel saw as claimed in claim 1, wherein the sealing wall is a flexible foil which is substantially impermeable to air and, can be rolled up on a vertical spindle, the free edge of which is connected via tension members to a counterweight.

3. The panel saw as claimed in one of claims 1 or 2, wherein the free edge of the sealing wall has a sealing construction which extends over its entire height.

4. The panel saw as claimed in claim 3, wherein the sealing construction has a flexible sealing lip.

5. The panel saw as claimed in claim 3, wherein the sealing construction has a rigid sealing lip which is fixed to the sealing construction by a hinge and is urged in the direction of the panel edge by a compression spring.

6. The panel saw as claimed in claim 1, wherein at least two rollers mounted in a loosely rotatable manner are connected to the sealing wall, said rollers being guided on a guide rail fixed in a stationary manner on the frame in order to ensure the vertical position and laterial guidance of the sealing wall.

7. The panel saw as claimed in claim 6, wherein the guide rail is a downwardly open U-section, the upper side of which serves as a support for one of said at least two rollers, wherein at least one other of said at least two rollers projects from below and into the U-section.

8. The panel saw as claimed in claim 1, wherein the said coupling means comprises a driving tang fixed to the beam.

* * * * *